United States Patent Office 2,882,321
Patented Apr. 14, 1959

2,882,321

OXAALKANE BISPHOSPHONIUM COMPOUNDS AND THE MANUFACTURE THEREOF

Clinton A. Dornfeld, Mundelein, Ill., assignor, by mesne assignments, to G. D. Searle & Co., Skokie, Ill., a corporation of Delaware No Drawing. Application March 29, 1954
Serial No. 419,607

11 Claims. (Cl. 260—606.5)

This invention relates to oxa- and polyoxa-alkane bisphosphonium compounds, and to processes for the preparation thereof. More particularly, this invention relates to compounds of the formula $$R_3\overset{+}{P}-(C_nH_{2n}O)_y-(C_mH_{2m}O)_z-C_nH_{2n}-\overset{+}{P}R_32X^-$$

wherein R is an aryl radical, $n$ and $m$ are positive integers amounting to at least 1 and not more than 4, $y$ is a positive integer amounting to at least 1 and not more than 5, $z$ is either 0 or a positive integer amounting to less than 3, and X is halogen.

In the foregoing structural formula, the aryl radicals comprehended by R include phenyl, biphenyl, naphthyl, benzyl, phenethyl, tolyl, xylyl, and such other aromatic hydrocarbon radicals as evolve by removal of a single hydrogen from compounds of hydrogen and carbon wherein there is present at least one benzene ring. In the foregoing formula, also $C_nH_{2n}$ and $C_mH_{2m}$ each represents an alkylene radical, to wit: a bivalent, saturated, acyclic, straight- or branched-chain hydrocarbon radical, examples of which are:

Methylene (—CH$_2$—),
1,2-ethylene (—CH$_2$CH$_2$—), 1,1-dimethyl-1,2-ethylene (—$\overset{\overset{\displaystyle CH_3}{|}}{\underset{\underset{\displaystyle CH_3}{|}}{C}}$CH$_2$—), 1,2-propylene (—CH$_2$$\overset{|}{C}$HCH$_3$), 2-methyl-1,3-propylene (—CH$_2$$\overset{\overset{\displaystyle CH_3}{|}}{C}$HCH$_2$—), Trimethylene (—CH$_2$CH$_2$CH$_2$—),
Tetramethylene (—CH$_2$CH$_2$CH$_2$CH$_2$—)

and such other alkylene radicals as fall within the purview of the aforesaid definition and terms.

When $z$ in the formula for compounds of this invention given above is equal to 0, the said formula reduces to $$R_3\overset{+}{P}-(C_nH_{2n}O)_y-C_nH_{2n}-\overset{+}{P}R_32X^-$$

wherein R, $n$, $y$, and X have the meanings hereinbefore assigned.

The subject compounds are valuable in medicine as cardioregulatory agents. Especially, their antihypertensive properties commend their use in reducing the elevated blood pressures characteristic of multiple disease states. Moreover, as vasodilators, they manifest a capacity for increasing the volume of blood flow to the extremities which makes them of value in the treatment of peripheral vascular disease, one of the commoner dysfunctions associated with the degenerative changes of advancing years.

Still further, the compounds of this invention are useful anticholinergic agents. They have the property of blocking the transmission of nerve impulses across the autonomic ganglia, as well as inhibiting nerve impulse transmission at the neuro-effector junctions of the parasympathetic and cerebrospinal nervous systems.

The compounds to which this invention relates are soluble in water, as also in aqueous solutions of alcohols and other water-miscible organic solvents. They may be administered in solid form as tablets or capsules; dissolved in aqueous media, they may be given parenterally.

The subject compounds are named in accordance with the suggestions on nomenclature contained in Sections 123, 124, and 297 of the "Introduction to the 1945 Subject Index of Chemical Abstracts."

The compounds which comprise this invention are derived from the corresponding dihalides. In a preferred embodiment of one of the processes of this invention, an appropriate dibromide or diiodide—that is, one having the formula $$X'-(C_nH_{2n}O)_y-(C_mH_{2m}O)_z-C_nH_{2n}-X'$$

wherein $n$, $m$, $y$ and $z$ have the meanings hereinbefore assigned, and X' is a halogen of choice—is caused to react with a tertiary aryl phosphine—for example, triphenylphosphine—at temperatures between 60° and 150° centigrade for periods of time ranging from 30 minutes to as long as several days. The reaction is ordinarily carried out in a non-aqueous polar solvent, desirably a chlorinated hydrocarbon such as chloroform or, when preferred, an oxygenated material such as pentane-2,4-dione, dimethylformamide or one of the nitroparaffins. A sealed system is maintained where the solvent used has a boiling point appreciably lower than the temperature at which the reaction is run. The phosphonium bromides and iodides of this invention so derived are converted to the claimed chlorides by heating with silver chloride—for example, in aqueous medium at reflux temperatures over a two-hour period.

The dihalide intermediates depicted in the formula above are in part obtained directly from commercial sources, the remainder being synthesized by techniques hereinafter described—for example, by halogen replacement of the hydroxyl groups in corresponding glycols, as follows: A selected glycol of the formula $$HO-(C_nH_{2n}O)_y-(C_mH_{2m}O)_z-C_nH_{2n}-OH$$

wherein $n$, $m$, $y$, and $z$ are defined as before, is reacted with a halogenating agent such as phosphorus tribromide in the presence of pyridine (base) or its equivalent, the reaction being completed in from 12 hours to as long as 3 days. Reduced temperatures of the order of 0° to 15° centigrade are commonly preferred, and the use of a non-aqueous polar solvent—for example, chloroform—is generally beneficial.

An exception to the foregoing preparation of dihalide intermediates from corresponding glycols is the method of Beeby and Mann, J. Chem. Soc., 1949, 1802, used in the synthesis of 1,3-dibromo-2-oxapropane. Paraformaldehyde, red phosphorus, and bromine are starting materials in this preparation, which is based on the procedure of Tischtschenko and Rabcevitsch-Zubkovski, J. Russ. Phys. Chem. Soc., 46, 705 (1914). The reactants are mixed during four hours at room temperature, then let stand 20 hours at this temperautre, and at last saturated with hydrogen bromide. Water is used as a solvent for the reaction.

A second variant preparation of dihalide intermediates is the interaction of paraformaldehyde, ethylene bromohydrin, and calcium chloride at 85° to 110° centigrade overnight to produce 1,7-dibromo-3,5-dioxaheptane.

Inasmuch as dibromides and diiodides are preferable to dichlorides for interaction with triaryl phosphine in accordance with the processes of the present invention, dichlorides are commonly not used directly in the subject processes; but instead are converted to the more desirable halogen compounds—for example, by 24-hour reaction with sodium bromide or iodide in a ketonic medium such as butanone, at reflux temperatures.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

2 - oxapropane - 1,3 - bis(triphenylphosphonium bromide).—A mixture consisting of 155 parts of 1,3-dibromo-2-oxapropane—prepared according to the method of Beeby and Mann, J. Chem. Soc., 1949, 1802—400 parts of triphenylphosphine, and 149 parts of dry chloroform is maintained at 60–65° C. for 15 hours in a sealed vessel, following which the reagents are cooled to room temperature and then poured into approximatley 4000 parts of anhydrous ether. A precipitate forms, which granulates on standing with agitation. Filtered out, then washed with ether, and finally dried at 60–65° C., the granular product shows M.P. 273–274° C. The 2-oxapropane-1,3-bis(triphenyl-phosphonium bromide) so obtained has the formula $$(C_6H_5)_3\overset{+}{P}-CH_2OCH_2-\overset{+}{P}(C_6H_5)_3 2Br^-$$

*Example 2*

3 - oxapentane - 1,5 - bis(triphenylphosphonium bromide).—A mixture of 200 parts of triphenylphosphine, 88 parts of 1,5-dibromo-3-oxanpentane, and 745 parts of dry chloroform is allowed to stand in a sealed vessel at 80° C. for 40 hours. The product—which fails to crystallize after 10 days at room temperature—is mixed with approximately 700 parts of anhydrous ether. A precipitate forms which, isolated by decantation, is intimately contacted with a second 700-part quantity of anhydrous ether. The precipitate is then recovered by filtration, washed on the filter with additional anhydrous ether, and finally dried at 80° C. overnight. The 3-oxapentane-1,5-bis(triphenylphosphonium bromide) thus obtained is purified by trituration and extraction with approximately 1600 parts of boiling butanone, following which it is filtered off and then washed on the filter with an additional 800 parts of fresh butanone. The product is next taken up in approximately 375 parts of hot, dry chloroform and then precipitated by addition, with agitation, of 1000 parts of hot dioxane. The precipitate is filtered from the hot mother liquor, which, on standing and cooling, yields a second crop of crystalline material. The first crop of product is still further purified by extraction, during agitation, with 2000 parts of butanone at the boiling point. Filtered from the hot ketone and then washed with an additional small quantity of hot butanone, the product, after drying at 80° C. overnight, shows M.P. approximately 245° C. It has the formula $$(C_6H_5)_3\overset{+}{P}-CH_2CH_2OCH_2CH_2-\overset{+}{P}(C_6H_5)_3 2Br^-$$

*Example 3*

A. *1,8-dibromo-3,6-dioxaoctane.*—To a mixture of 60 parts of triethylene glycol and 90 parts of chloroform is added, with agitation, 88 parts of phosphorus tribromide dissolved in approximately 130 parts of dry chloroform, the reagents being maintained at 0–10° C. throughout. The addition requires about 2 hours. Next, 12 parts of pyridine is slowly added, with continued agitation, the same low temperatures obtaining. This second addition being complete, the reactants are allowed to warm slowly to room temperature and stand thereat for 72 hours. The resultant mixture, washed well with an equal volume of 10% aqueous muriatic acid and then twice with like volumes of water, is stripped of solvent under a water pump vacuum. From the residue, on distillation, is obtained 1,8-dibromo-3,6-dioxaoctane. The product, redistilled, shows B.P. 143–147° C. at 14 mm. pressure.

B. *3,6-dioxaoctane-1,8-bis(triphenylphosphonium bromide).*—A solution of 21 parts of triphenylphosphine and 11 parts of 1,8-dibromo-3,6-dioxaoctane in 149 parts of dry chloroform is heated at 100° C. for 15 hours in a sealed vessel. The solution is cooled to room temperature and then mixed with 425 parts of anhydrous ether to give a syrupy precipitate. Ether is decanted off. The precipitate is granulated by agitation with approximately 800 parts of boiling butanone. Filtered out and crystallized from 100 parts of 2,4-pentanedione, the product thus obtained, 3,6-dioxaoctane-1,8-bis(triphenylphosphonium bromide), shows M.P. approximately 195° C. It has the formula $$(C_6H_5)_3\overset{+}{P}-(CH_2CH_2O)_2-CH_2CH_2\overset{+}{P}(C_6H_5)_3 2Br^-$$

*Example 4*

A. *1,11-dibromo-3,6,9-trioxaundecane.*—Fractionation of commercial polyethylene glycol having an average molecular weight of 200 affords tetraethylene glycol, B.P. 160–162° C. at 2 mm. pressure, $n_D^{25}$ 1.4587. To 155 parts of this glycol in 180 parts of dry chloroform is added, with agitation at 0–10° C., 176 parts of phosphorus tribromide in 265 parts of dry chloroform. When this addition is completed, the same lowered temperature is maintained while 24 parts of pyridine is introduced. The reagents are then allowed to warm to room temperature and stand thereat for 48 hours. The reaction product, washed well with an equal volume of 10% aqueous muriatic acid and then twice with like quantities of water, is stripped of solvent under water pump vacum. The residue yields, on vacuum distillation, 1,11-dibromo-3,6,9-trioxaundecane, B.P. 179–184° C. at 16 mm. pressure.

B. *3,6,9-trioxaundecane-1,11 - bis(triphenylphosphonium bromide).*—In accordance with the general procedure of Example 3B, 64 parts of 1,11-dibromo-3,6,9-trioxaundecane, 105 parts of triphenylphosphine, and 750 parts of dry chloroform are reacted together in a closed system at 100° C. for 17 hours to give 3,6,9-trioxaundecane-1,11-bis(triphenylphosphonium bromide) having the formula $$(C_6H_5)_3\overset{+}{P}-(CH_2CH_2O)_3-CH_2CH_2-\overset{+}{P}(C_6H_5)_3 2Br^-$$

*Example 5*

A. *1,14-dibromo-3,6,9,12 - tetraoxatetradecane.*—Fractional distillation of commercial polyethylene glycol having an average molecular weight of 200 affords pentaethylene glycol, B.P. 184–188° C. at 2 mm. pressure, $n_D^{25}$ 1.4617. A solution of 291 parts of this glycol and approximately 37 parts of pyridine in 450 parts of dry chloroform is cooled to 3° C. Approximately 301 parts of phosphorus tribromide dissolved in 450 parts of dry chloroform is added thereto with agitation, over a 5½ hour period, the temperature being maintained below 10° C. The reaction mixture is allowed to warm to 20–25° C. and then stand overnight, agitation being continued throughout. Solvent is stripped at the water pump, following which the residue is washed twice with 10% aqueous muriatic acid and twice more with water. On distillation, the residue affords a principal fraction, B.P. 169–173° C. at 1.8 mm. pressure. This material, 1,14-dibromo-3,6,9,12 - tetraoxatetradecane shows $n_D^{25}$ 1.4918.

B. *3,6,9,12-tetraoxatetradecane-1,14-bis(triphenylphosphonium bromide).*—A solution of 100 parts of triphenylphosphine and 69 parts of 1,14-dibromo-3,6,9,12-tetraoxatetradecane in 750 parts of dry chloroform is heated in a sealed vessel at 105° C. for 41 hours. The product is cooled and then mixed with 21 parts of anhydrous ether. A heavy syrup forms. The supernatant ether is decanted therefrom and fresh ether then added. The materials are thoroughly mixed, following which the ether is again decanted off and the residue then agitated at 60° C. overnight to induce granulation. The granular product is purified by extraction with 400 parts of boiling butanone, following which it is crystallized from approxmiately 500 parts of 2,4-pentanedione. The material thus obtained, M.P. 177–178° C., is 3,6,9,12-tetraoxatetradecane-1,14-bis(triphenylphosphonium bromide) having the formula

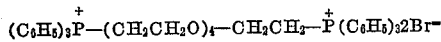

Example 6

A. *1,7-diiodo-4-oxaheptane.*—A mixture of 175 parts of 1,7-dichloro-4-oxaheptane, 459 parts of sodium iodide, and 4000 parts of butanone is heated with agitation at reflux temperatures for 24 hours. The white solid is filtered from the reaction mixture and then washed on the filter with a little fresh butanone. Filtrate and washings are concentrated in vacuo to approximately one-tenth of their original volume, following which water and approximately 1100 parts of ether are added. The materials are well mixed, then allowed to stand and layer out. The aqueous phase is discarded. The ethereal residue is washed with water, aqueous sodium thiosulfate, and twice more with water, in that order. The ether solution is then dried over anhydrous sodium sulfate and, finally, stripped of solvent in vacuo. The residue, on distillation, affords pure 1,7-diiodo-4-oxaheptane, B.P. 176° C. at 0.1 mm. pressure.

B. *4 - oxaheptane - 1,7 - bis(triphenylphosphonium iodide).*—A solution of 100 parts of triphenylphosphine and 67 parts of 1,7-diiodo-4-oxaheptane in 750 parts of dry chloroform is heated in a closed vessel at 105° C. for 20 hours. The reactants are cooled to room temperature and then poured into 2100 parts of anhydrous ether. A precipitate forms. The precipitated material is dissolved in a boiling mixture of 1580 parts of propanol-2 and 4000 parts of ethanol. A small amount of insoluble material is filtered from the hot solution and discarded. The filtrate is treated with decolorizing charcoal at the boiling point and then cooled, precipitating 4-oxaheptane-1,7-bis(triphenylphosphonium iodide) in process, M.P. approximately 242° C. A second crop of crystalline product is obtained on concentration of the mother liquors at elevated temperatures and subsequent chilling.

C. *4 - oxaheptane - 1,7-bis(triphenylphosphonium chloride).*—A solution of 43 parts of the bisiodo compound of the preceding part B in 4000 parts of water is mixed with 14 parts of silver chloride and refluxed for 2 hours. The 4-oxaheptane-1,7-bis(triphenylphosphonium chloride) thus produced has the formula

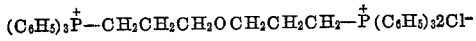

Example 7

A. *1,5-diiodo-2,4-dimethyl-3-oxapentane.*—Using the technique of the preceding Example 6A, 88 parts of 1,5-dichloro-2,4-dimethyl-3-oxapentane is reacted with 230 parts of sodium iodide in approximately 2000 parts of boiling butanone to give 1,5-diiodo-2,4-dimethyl-3-oxapentane.

B. *2,4 - dimethyl - 3-oxapentane-1,5-bis(triphenylphosphonium iodide).*—Using the technique of Example 6B, 20 parts of 1,5-diiodo-2,4-dimethyl-3-oxapentane and 30 parts of triphenylphosphine are reacted together in 225 parts of dry chloroform at 100° C. The reaction is carried out in a sealed vessel over a 36 hour period of time. The 2,4 - dimethyl - 3-oxapentane-1,5-bis(triphenylphosphonium iodide) thus produced has the formula

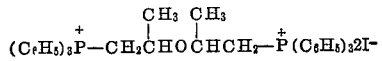

Example 8

A. *1,9-diiodo-5-oxanonane.*—Using the technique of Example 6A, 50 parts of 1,9-dichloro-5-oxanonane is converted to the corresponding iodo compound by treatment with 115 parts of sodium iodide in 1000 parts of butanone at the boiling point.

B. *5 - oxanonane - 1,9 - bis(triphenylphosphonium iodide.)*—Interaction of 50 parts of triphenylphosphine and 36 parts of 1,9-diiodo-5-oxanonane at 105° C. in accordance with the technique of Example 6B, using chloroform as the solvent, affords in good yield 5-oxanonane-1,9-bis(triphenylphosphonium iodide), M.P. approximately 232° C., having the formula

Example 9

A. *1,7-dibromo-3,5-dioxaheptane.*—A mixture of 15 parts of paraformaldehyde, 15 parts of finely powdered calcium chloride, and 125 parts of ethylene bromohydrin is heated, with agitation, at 85–100° C. overnight. The reaction mixture, cooled to room temperature, separates into two layers on standing. The bottom layer is drawn off and discarded. The residual material, upon repeated distillation, shows B.P. 161–166° C. at 0.2 mm. pressure. The product thus obtained is 1,7-dibromo-3,5-dioxaheptane.

B. *3,5-dioxaheptane-1,7-bis(triphenylphosphonium bromide).*—A solution of 20 parts of triphenylphosphine and 10 parts of 1,7-dibromo-3,5-dioxaheptane in 75 parts of dry chloroform is allowed to stand at 100° C. in a closed vessel overnight. The solution is cooled and then poured into approximately 200 parts of anhydrous ether. A syrupy precipitate forms, which granulates on standing. The granular product is crystallized from dimethylformamide, using decolorizing charcoal in process, to give pure white 3,5 - dioxaheptane - 1,7-bis(triphenylphosphonium bromide), M.P. approximately 235° C. This material has the formula

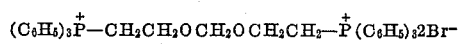

I claim:

1. A compound containing fewer than 11 aliphatic carbon atoms and fewer than 5 oxygen atoms, and which is selected from the group consisting of compounds of the formula $$R_3P^+ - (C_nH_{2n}O)_y - C_nH_{2n} - P^+R_3 2X^-$$

and compounds of the formula $$R_3P^+ - (C_nH_{2n}O)_y - CH_2O - C_nH_{2n} - P^+R_3 2X^-$$

in which formulas R is a phenyl radical, n and y are positive integers amounting to at least 1 and less than 5, and X is halogen of atomic number greater than 9.

2. A compound of the formula $$R_3P^+ - C_nH_{2n}O - CH_2O - C_nH_{2n} - P^+{}_3 2X^-$$

where in R is a phenyl radical, n is a positive integer amounting to at least 1 and less than 5 and X is halogen of atomic number greater than 9.

3. A compound containing fewer than 11 aliphatic carbon atoms and fewer than 5 oxygen atoms, and having the formula $$R_3P^+ - (C_nH_{2n}O)_y - C_nH_{2n} - P^+R_3 2X^-$$

wherein R is a phenyl radical, n is a positive integer amounting to at least 1 and less than 5, and X is halogen of atomic number greater than 9.

4. 4-oxaheptane-1,7-bis(triphenylphosphonium iodide).
5. 5-oxanonane-1,9-bis(triphenylphosphonium iodide).
6. 2-oxapropane-1,3 - bis(triphenylphosphonium bromide).
7. 3,6-dioxaoctane-1,8-bis(triphenylphosphonium bromide).

8. 3,5 - dioxaheptane-1,7 - bis(triphenylphosphonium bromide).

9. In a process for the preparation of compounds containing fewer than 11 aliphatic carbon atoms and fewer than 5 oxygen atoms, and which are selected from the group consisting of compounds of the formula $$R_3P^+—(C_nH_{2n}O)_y—C_nH_{2n}—P^+R_32X^-$$

and compounds of the formula $$R_3P^+—(C_nH_{2n}O)_y—CH_2O—C_nH_{2n}—P^+R_32X^-$$

in which formulas R is a phenyl radical n and y are positive integers amounting to at least 1 and less than 5, and X is halogen of atomic number greater than 9, the steps which comprise (a) reacting in a non-aqueous polar solvent a compound containing fewer than 11 carbon atoms and fewer than 5 oxygen atoms, and which is selected from the group consisting of compounds of the formula $$X'—(C_nH_{2n}O)_y—C_nH_{2n}—X'$$

and compounds of the formula $$X'—(C_nH_{2n}O)_y—CH_2O—C_nH_{2n}—X'$$

in which formulas n and y have the meanings hereinbefore assigned, and X' is halogen of atomic number greater than 17, with triphenylphosphine at temperatures between 60° and 150° centigrade for periods of time ranging from 30 minutes to 3 days; and (b) isolating the reaction product.

10. In the process for the preparation of compounds containing fewer than 11 aliphatic carbon atoms and fewer than 5 oxygen atoms, and which are selected from the group consisting of compounds of the formula $$R_3P^+—(C_nH_{2n}O)_y—C_nH_{2n}—P^+R_32X^-$$

and the compounds of the formula $$R_3P^+—(C_nH_{2n}O)_y—CH_2O—C_nH_{2n}—P^+R_32X^-$$

in which formulas R is a phenyl radical, n and y are positive integers amounting to at least 1 and less than 5, and X is halogen of atomic number greater than 9, the steps which comprise (a) reacting in a non-aqueous polar solvent a compound containing fewer than 11 carbon atoms and fewer than 5 oxygen atoms, and which is selected from the group consisting of compounds of the formula $$Br—(C_nH_{2n}O)_y—C_nH_{2n}—Br$$

and compounds of the formula $$Br—(C_nH_{2n}O)_y—CH_2O—C_nH_{2n}—Br$$

in which formulas n and y have the meanings hereinbefore assigned, with triphenylphosphine at temperatures between 60° and 150° centigrade for periods of time ranging from 30 minutes to 3 days; and (b) isolating the reaction product.

11. In a process for the preparation of compounds containing fewer than 11 aliphatic carbon atoms and fewer than 5 oxygen atoms, and which are selected from the group consisting of compounds of the formula $$R_3P^+—(C_nH_{2n}O)_y—C_nH_{2n}—P^+R_32X^-$$

and compounds of the formula $$R_3P^+—(C_nH_{2n}O)_y—CH_2O—C_nH_{2n}—P^+R_32X^-$$

in which formulas R is a phenyl radical, n and y are positive integers amounting to at least 1 and less than 5, and X is halogen of atomic number greater than 9, the steps which comprise (a) reacting in a closed system, using chloroform as solvent, a compound containing fewer than 11 carbon atoms and fewer than 5 oxygen atoms, and which is selected from the group consisting of compounds of the formula $$Br—(C_nH_{2n}O)_y—C_nH_{2n}—Br$$

and compounds of the formula $$Br—(C_nH_{2n}O)_y—CH_2O—C_nH_{2n}—Br$$

in which formulas n and y have the meanings hereinbefore assigned, with triphenylphosphine at temperatures between 60° and 150° centigrade for periods of time ranging from 30 minutes to 3 days; and (b) isolating the reaction product.

References Cited in the file of this patent

UNITED STATES PATENTS

| | | |
|---|---|---|
| 1,921,364 | Lommel et al. | Aug. 8, 1933 |
| 2,214,352 | Schoeller et al. | Sept. 10, 1940 |
| 2,745,877 | Bindler et al. | May 15, 1956 |

FOREIGN PATENTS

| | | |
|---|---|---|
| 730,575 | Germany | Jan. 28, 1943 |
| 730,638 | Germany | Jan. 15, 1943 |

OTHER REFERENCES

Ginzel et al.: Chem. Abs. 47, col. 4496 (1953).

Hager et al.: Jour. Amer. Pharmaceutical Assoc., vol. 42, No. 1, p. 9, January 1953.

Fieser et al.: Organic Chem., 2nd ed. (Heath), page 32.

Ginzel et al.: Chem. Abs. 48, col. 8951 (1954).

Barnhart: The American College Dictionary, Random House, N.Y., 1955, page 632.

UNITED STATES PATENT OFFICE

Certificate of Correction

Patent No. 2,882,321

April 14, 1959

Clinton A. Dornfeld

It is hereby certified that error appears in the printed specification of the above numbered patent requiring correction and that the said Letters Patent should read as corrected below.

Column 6, line 57, for "$P^+{}_32X^-$" read —$P^+R_3$    $2X^-$—; line 60, after the numeral "5" insert a comma; line 67, for "$n$ is a positive integer" read —$n$ and $y$ are positive integers—; column 7, line 31, for "In the process" read —In a process—; line 36, for "and the compounds of the formula" read —and compounds of the formula—.

Signed and sealed this 20th day of October 1959.

[SEAL]

Attest:
KARL H. AXLINE,
*Attesting Officer.*

ROBERT C. WATSON,
*Commissioner of Patents.*